United States Patent Office 3,677,818
Patented July 18, 1972

3,677,818
PROCESSES FOR PREPARING MANNOSE AND MANNOSE DERIVATIVES
Ronald L. Casebier, Franklin W. Herrick, and Kenneth R. Gray, Shelton, and Frederic A. Johnston, Aberdeen, Wash., assignors to International Telephone and Telegraph Corporation, New York, N.Y.
No Drawing. Filed Apr. 2, 1970, Ser. No. 25,257
Int. Cl. C13k 9/00
U.S. Cl. 127—46 R
60 Claims

ABSTRACT OF THE DISCLOSURE

Methods for preferentially crystallizing mannose bisulfite adducts from aqueous mannose-containing solutions. These mannose adducts can be recovered in pure form. Also methods for regenerating substantially pure mannose from the mannose bisulfite adducts.

---

This invention relates to processes for preparing mannose and mannose derivatives. More particularly, it relates to methods for producing substantially pure mannose bisulfite adducts from complex, gross carbohydrate mixtures containing mannose or its polymers or copolymers and then converting these adducts to substantially pure mannose or mannose derivatives.

Mannose and its derivatives are articles of commerce used in foods (e.g., low calorie dietectic food products), pharmaceuticals, cosmetics, textiles and in the manufacture of polymers. The principal source of mannose, at the present time, is mannan from ivory nut meal which, when hydrolyzed, liberates D-mannose. However, because of limited supplies of this raw material, mannose is very expensive in comparison with other more common hexose sugars. As a result, use of mannose, commercial and otherwise, has not been as widespread as its many desirable properties would indicate.

Mannitol, the polyol derivative of mannose, can be prepared by catalytic, chemical or electrolytic reduction of mannose. But, when produced by such procedures, mannitol suffers from the same competitive disadvantages, as compared with other polyhydric alcohols, as mannose itself. Mannitol is currently being produced on a fairly large scale by the reduction of glucose, fructose or invert sugar, but here again, the cost is high.

Therefore, there exists an unsatisfied need for large quantities of both mannose and mannitol that will be more competitive in price with other comparable sugars and polyhydric alcohols.

Plentiful and heretofore unexploited sources of mannose exist in nature. Many plant materials, such as seed endosperm tissue and certain plant gums and exudates contain mannose or its structural component in the form of carbohydrate polymers and copolymers. In addition, most woody plant tissues, and in particular those from the coniferous or soft woods commonly used in the manufacture of paper and chemical cellulose, contain substantial quantities of mannose, primarily in the form of carbohydrate polymers and copolymers, along with other wood sugars, complex polysaccharides and other carbohydrates. However, the difficulty of extracting and recovering mannose from its complex natural environment, in good yields without degrading it, has been a continuing problem which has not been solved heretofore.

For example, it has been recognized previously that the liquors from wood pulping operations are rich in wood sugar content and would be a valuable source for the extraction and production of these wood sugars. But, because of the extremely complex composition of the pulping liquors, it has not been possible heretofore to isolate and recover any single component, and mannose in particular, from the gross mixtures. Additional difficulty in extracting these sugars has been caused by the stereoisomeric relationships between many of the monosaccharides and other components of these liquors. As a consequence, despite their valuable wood sugar content, these liquors have been discarded as waste material or used in the production of less valuable bulk products or burned for inorganic chemical and heat recovery.

Exemplary of the potentially important sources for mannose is as a by-product in the production of highly refined cellulose from wood. In the production of these products, a high pressure, high temperature steam or water prehydrolysis digestion step is frequently employed. This prehydrolysis stage solubilizes and removes substantial amounts of carbohydrates, up to 85% of the extract being a mixture of wood sugars and lower molecular weight oligo- and polysaccharides. The prehydrolysis liquor constitutes a rich and plentiful source of mannose.

A variant of the water prehydrolysis process is the addition of a limited amount of sulfite reagent in the prehydrolysis step which improves the dissolution and hydrolysis of non-cellulosic carbohydrates. Prehydrolysis liquors of this type contain mannose and other wood sugars predominantly in a monomeric form. These sulfite prehydrolysis liquors also form a potentially valuable source of mannose, if the mannose content of such liquors can be extracted and recovered from the gross mixture.

Another potentially important source of mannose is spent sulfite cooking liquor from wood pulping operations. These liquors usually contain substantial quantities of free mannose and water soluble polymers and copolymers of mannose. However, these spent liquors also contain an enormously complex mixture of other wood sugars and water soluble polymers and copolymers thereof. Furthermore, these spent liquors contain lignin, lignosulfonates, inorganic cooking chemicals and other contaminants. In addition, products formed by condensation reactions between wood constituents or by rearrangement processes on individual compoents thereof are usually present as a result of the chemical treatment of the wood pulp.

It is therefore, an object of the present invention to provide methods for treating complex gross carbohydrate mixtures containing mannose or its polymers or copolymers to produce valuable mannose products.

Another object is to provide methods for recovering valuable pure sugar components from prehydrolysis liquors and spent sulfite liquors in wood pulping operations.

A further object is to provide methods for preparation and recovery of substantially pure sugar bisulfite adducts from impure aqueous solutions of wood sugar carbohydrates containing wood sugars and copolymers thereof.

A still further object is to provide methods for producing substantially pure monosaccharides from the corresponding sugar bisulfite adducts.

Yet another object is to provide practical and economical methods for preferential recovery of mannose bisulfite adducts from impure acqueous solutions of wood sugars and converting these adducts to substantially pure mannose or mannose derivatives.

Other objects, if not specifically set forth herein, will be readily apparent to those skilled in the art from the following detailed description of the invention.

As a result of an intensive investigation, we have discovered methods for isolating and recovering the mannose content of complex mannose-containing aqueous solutions, and in particular of crude hydrolysate liquors from wood pulping operations.

We have found that bisulfite adducts of mannose, such as alkali metal mannose bisulfites and ammonium mannose bisulfite, preferentially crystallized from complex mannose-containing aqueous solutions in excellent yields and to the substantial exclusion of impurities. The resulting mannose bisulfite compounds can be recovered readily in substantially pure form. The finding that a single carbohydrate derivative can be selectively fractionated, in excellent yields, from gross mixtures, which contain a variety of sugars and their polymers and copolymers, lignin derived contaminants, and other impurities, is contrary to previous experience.

The resulting substantially pure bisulfite adducts of mannose are useful as raw materials for the production of mannose and mannitol, both of which substances are used in commerce.

Furthermore, we have discovered techniques for regenerating substantially pure mannose from the alkali metal or mannose bisulfite adducts. For example, it has been found that when the mannose bisulfite adduct is reacted with an alkali metal carbonate or bicarbonate, alkali metal hydroxides and alkaline earth metal hydroxides, under carefully controlled conditions of time, temperature, reaction mixture composition and the like, that the adduct is converted substantially quantitatively to free mannose and the corresponding alkali metal sulfite or alkaline earth metal sulfite. Substantially pure mannose is recovered therefrom, for example, by alcohol extraction, neutralization and purification of the reaction solution, again under carefully controlled conditions of temperature, time and the like.

Alternatively, we have discovered that the mannose bisulfite adducts can be converted into substantially pure mannose and mannose derivatives by other processes such as electrodialysis, ion exchange techniques, and by treatment of the mannose bisulfite adducts with calcium chloride.

More particularly, the processes of the present invention for preparing mannose bisulfite adducts and accordingly, substantially pure mannose and derivatives thereof comprise treating complex gross carbohydrate mixtures containing monomeric wood sugars such as mannose, glucose, galacetose, arabinose and xylose with a slight excess of bisulfite reagent. Water soluble bisulfite adducts are thus formed of substantially all of the monomeric wood sugars present in the mixture. Thereafter, within appropriate limits of solution concentration, temperature, time and organic solvent addition, the mannose bisulfite adduct preferentially crystallizes out of the solution and can be recovered in substantially pure form by known techniques such as filtration.

Substantially pure mannose can then be regenerated from the mannose bisulfite adducts. Exemplary of methods which we have found for producing mannose from the mannose bisulfite adducts is to treat the bisulfite addition products with substantially equimolar amounts of a suitbale carbonate or bicarbonate (preferably the bicarbonate). The mixture is dissolved in sufficient hot water to form a thick syrup. This syrupy reaction solution is maintained at at temperature of between about 70° and 100° C., with agitation, until evolution of carbon dioxide has substantially ceased. The hot aqueous reaction mixture is then mixed with about 6 to 10 volumes, and preferably about 8 volumes, of hot alcohol (preferably ethanol). The alcohol solution is thoroughly mixed and filtered while still hot to remove alcohol-insoluble materials such as sulfites, by-products, and the like. The hot, slightly alkaline, sugar-containing alcohol filtrate is then neutralized with an aqueous alcohol solution of calcium chloride and the neutralized solution again filtered to remove newly precipitated impurities and color bodies. The resultant clarified alcohol filtrate is then treated as by heating or vacuum distillation to remove the alcohol, leaving an aqueous solution or syrup of substantially pure mannose. This mannose solution can be used as such or pure crystalline mannose recovered therefrom by any convenient process.

In some instances, the original gross carbohydrate mixture contains a substantial portion of wood sugar carbohydrates in the form of polysaccharides. The mannose content of such mixtures is present principally in the form of water-soluble polymers and copolymers. For example, aqueous hydrolysate liquors from the prehydrolysis of soft wood chips provides such a gross mixture.

With gross mixtures of this type, we have found that an initial hydrolysis step is necessary to convert the polysaccharides to monosaccharides before further treatment in order to promote maximum yield of product. Various mineral acids can be employed to accomplish this hydrolysis or depolymerization step. However, for purposes of economy and avoidance of contamination, it is preferred to employ dilute sulfurous acid.

When the original wood sugar content, including the mannose content, of the gross mixture is essentially in the form of monsaccharides, it is not necessary to subject the mixture to a secondary acid hydrolysis step. For example, the mannose content of spent sulfite liquors or sulfite prehydrolysis liquors is predominantly in the form of the monomeric sugar. Consequently, such liquors can be reacted immediately with a bisulfite reagent to form the appropriate bisulfite adducts.

In greater detail, once a gross carbohydrate solution is obtained having substantially all of the mannose content in monomeric form, then an amount of alkali metal or ammonium bisulfite is added to the gross mixture. The bisulfite reagent should be added in an amount sufficient to form the corresponding water soluble alkali metal or ammonium bisulfite adducts of essentially all of the wood sugars present in the solution. The resultant reaction solution is then treated to preferentially precipitate crystals of alkali metal or ammonium mannose bisulfite to the substantial exclusion of the bisulfite adducts of the other wood sugars present in the gross solution. Thereafter, the crystals of the mannose bisulfite adducts are separated and recovered, for example, by filtration of the solution. The crystalline product thus obtained may then advantageously be treated, for example, by recrystallization, to obtain a substantially pure alkali metal or ammonium bisulfite product.

Suitable bisulfite reagents for incorporation into the gross mixture include sodium bisulfite, potassium bisulfite, ammonium bisulfite and the like and mixtures thereof. Also, the reaction of the bisulfite reagent with the monomeric sugars present in the gross mixture may be performed over a wide range of temperatures such as from about 0° C. to 150° C. However, the reaction is most advantageously carried out at a temperature of between 50 and 100° C.

Preferential precipitation of the resultant water soluble mannose bisulfite adduct is advantageously accomplished by concentrating the solution so that it contains from about 25 to 50% by weight of carbohydrate solids. Thereafter, the mixture is cooled to initiate the preferential precipitation of the crystalline product. If desired, crystals of an appropriate alkali metal or ammonium mannose bisulfite adduct may be added to the cooled solution to expedite crystallization. Also, the addition of up to about an equal volume of an aliphatic alcohol (preferably methanol) to the concentrated cooled solution promotes increased yield of mannose bisulfite product recovered.

More specifically, in one embodiment of the present invention methods are provided for preparing and recovering mannose bisulfite adducts from impure aqueous solutions containing complex mixtures of free sugars and polysaccharides, including mannose and polymers and copolymers of mannose. The spent liquors from wood pulping operations comprise one of the principal sources of such impure mannose-containing solutions.

Spent liquors useful in the practice of our invention include, but are not limited to, spent sulfite pulping liquors, aqueous prehydrolysis liquors and sulfite prehydrolysis liquors.

Usually, the major portion of the mannose and other wood sugars are present in spent sufite liquor and sulfite prehydrolysis liquor in the form of free (i.e., non-polymerized) monomeric sugars. However, in the case of aqueous prehydrolysis liquor, the major portion of the mannose is usually present in the liquor in the form of water-soluble polymers and copolymers of mannose. As a result, the latter liquor is first advantageously treated to hydrolyze the polysaccharides present in solution and thereby convert them to their component monomeric form.

Hydrolysis of the polysaccharides is advantageously effected by heating the solution in the presence of a mineral acid. In a preferred embodiment of our invention, the polysaccharides are hydrolyzed to free monomeric sugars with sulfurous acid. More particularly, sufficient sulfurous acid is added to the solution to obtain an $SO_2$ concentration of from about 1.75 to 3.6% by weight of the solution. The solution is then heated at a temperature of from about 110 to 150° C. for a period of about 0.5 to 6 hours to effect substantially complete hydrolysis of the polysaccharide content of the solution. The solution is then neutralized with sufficient sodium or potassium hydroxide to raise the pH to about 4, or slightly above, prior to reacting the solution with a bisulfite reagent to form alkali bisulfite and, therefore, the adduct, in situ.

The impure mannose-containing solution, whether subjected to secondary acid hydrolysis of the polysaccharides or used in its original state, is treated with an alkali metal bisulfite reagent such as sodium or potassium bisulfite or an ammonium bisulfite reagent (optionally, either the acid sulfite or the meta-bisulfite). An amount of bisulfite reagent is employed sufficient to react with all of the wood sugars present in the solution and to form the corresponding sugar bisulfite adducts. Preferably, the amount of bisulfite reagent added to the solution is such that the overall level of bisulfite in the solution is about 30 to 40% by weight of the total carbohydrate solids present in the solution.

The solution containing wood sugars and the bisulfite reagent is then advantageously treated at a temperature of from about 0° to 150° C. for a period of up to about six hours to convert substantially all of the wood sugars to the corresponding sugar bisulfite adducts and the mixture is cooled. The cooled solution may be seeded with appropriate mannose bisulfite crystals to expedite crystallization. Advantageously, about an equal volume of an aliphatic alcohol (preferably methanol) is added to the cool solution to increase the ultimate yield of mannose bisulfite adduct.

Upon cooling, the desired alkali metal or ammonium mannose bisulfite product preferentially crystallizes out of the solution. The alkali metal or ammonium mannose bisulfite precipitate is separated from the cooled mother liquor, for example, by filtration, decantation, centrifuging and the like, and the separated bisulfite precipitate is recovered.

The crystals of mannose bisulfite adduct are normally somewhat contaminated with entrained mother liquor and other impurities, and these impurities are advantageously removed by washing the crystals with methanol or mixtures of methanol and water in which the bisulfite product is only sparingly soluble. Alternatively, the crystals can be redissolved in warm water or other suitable solvent and recrystallized in the usual manner to obtain a substantially pure alkali metal mannose bisulfite product.

As above described, processes are new provided for extracting substantially pure mannose bisulfite adducts from complex gross mixtures. However, a further heretofore unsolved problem is to provide methods for regenerating substantially pure mannose and mannose derivatives from these adducts in those cases where it is desired to form the simple sugar products. Therefore, a further embodiment of the present invention comprises the provision of methods for producing substantially pure mannose. The methods which we have discovered comprise chemical treatment of the mannose bisulfite adducts with reagents such as alkali metal carbonates or bicarbonates, alkali metal hydroxides, alkaline earth metal hydroxides, calcium chloride and the like; electrodialysis; and ion exchange techniques.

More particularly, a preferred method which we have found for recovering substantially pure mannose from mannose bisulfite adducts comprises mixing the bisulfite adducts with an equimolar amount of a suitable alkali metal carbonate or, preferably, bicarbonate. The mixture is then dissolved in sufficient, hot water to form a thick syrup. The temperature of the syrupy reaction mixture is maintained between about 70°–100° C. for a period of time sufficient for substantial completion of the reaction and for evolution of carbon dioxide gas to substantially cease, preferably between about 10–20 minutes.

The syrupy reaction mixture is slightly alkaline. Since mannose is alkali sensitive and subject to molecular rearrangement to such by-products as fructose and glucose, the reaction must be completed and the solution neutralized as quickly as possible. Accordingly, immediately upon completion of the reaction, an amount of a hot aliphatic alcohol (preferably ethanol) is added to the reaction mixture. Preferably, between about 6 to 10 volumes of alcohol are added, and most preferably about 8 volumes. After thorough mixing, the resulting alcoholic solution is filtered to remove alcohol-insoluble matter such as alkali metal or ammonium sulfites and carbonates. The hot alcoholic filtrate is immediately neutralized with an alcoholic solution of calcium chloride to precipitate the remaining sulfites and other impurities and then filtered to remove these precipitates.

Prompt neutralization of the slightly alkaline alcoholic solution is necessary to prevent appreciable molecular rearrangement of the free mannose to undesirable by-products. In addition, the calcium chloride substantially reduces the sulfite-containing compounds present in the solution by causing precipitation of calcium sulfite, calcium sulfate, calcium lignosulfonate and other calcium compounds, thus facilitating conversion of mannose to the corresponding polyhydric alcohol, mannitol, if desired. Furthermore, the precipitation of the calcium compounds with calcium chloride has the surprising and highly desirable affect of decolorizing the solution, principally through the precipitation of such color components as lignosulfonates and the like. As a result, costly treatment of the solution with charcoal or other decolorizing agents is obviated.

The neutralized and decolorized solution is then treated, as by vacuum distillation, to remove the alcohol and obtain a concentrated aqueous solution of substantially pure mannose. If desired, crystalline mannose can be recovered from the aqueous solution by conventional methods. However, the solution can be used as such, for example, in the production of mannitol.

In greater detail, another method which we have discovered for converting alkali metal or ammonium mannose bisulfite to free mannose comprises heating an aqueous solution of the mannose bisulfite adduct with calcium chloride. During the heat treatment, sulfur dioxide is evolved from the reaction mixture, and concurrently, an insoluble precipitate of calcium sulfite is produced. The reaction time and temperature is carefully controlled to maximize removal of sulfur from the reaction mixture as sulfur dioxide and calcium sulfite. The removal of sulfur dioxide can be enhanced by steam stripping, reduced pressure, forced air stripping and the like.

After completion of the calcium chloride treatment and removal of the sulfur component, an aqueous solution rich in mannose is obtained. If desired, crystalline mannose can be recovered from the aqueous solution by conventional methods. Additionally, the mannose solution is an excellent intermediate for the production of mannose derivatives. For example, the solution may be evaporated to dryness and then treated with methanol, in the presence of an acid catalyst, to produce methyl mannosides. As another example, the mannose solution can be subjected to catalytic reduction to yield mannitol.

In a further advantageous technique, we have found that the alkali metal or ammonium mannose bisulfite adduct can be electrodialyzed into its component chemical constituents. Accordingly, substantially pure mannose can be recovered from the bisulfite adducts by known methods of electrodialysis.

Another preferred process which we have discovered for producing substantially pure mannose from aqueous solutions of alkali metal or ammonium mannose bisulfite is by ion-exchange methods. For example, an aqueous solution of a mannose bisulfite adduct is passed through an ion-exchange column containing a suitable, commercially available cationic exchange resin. The resulting decationized solution then is passed through a column containing a suitable, commercially available anionic resin. The solution thus obtained is evaporated to dryness and the solids extracted with a suitable reagent such as hot ethanol. This mixture is further treated, as by filtration, solids extraction, further filtration and evaporation, to produce a substantially pure mannose product.

The following examples are set forth for purposes of illustration only and are not intended to be construed as being limitative in any respect.

EXAMPLE I

The present example illustrates the preparation of sodium mannose bisulfite from sodium-base spent sulfite liquor having the following partial analysis:

| Dry solids | Percent by weight | |
|---|---|---|
| Sodium lignosulfonate | 61.5 | |
| Sodium | 4.6 | |
| Total sulfur | 5.1 | |
| | Free | Total |
| Carbohydrates: | | |
| Xylose | 3.3 | 3.3 |
| Arabinose | 1.5 | 1.5 |
| Mannose | 12.1 | 14.2 |
| Glucose | 3.3 | 5.5 |
| Galactose | 3.1 | 3.8 |

Seven hundred grams (700 g.) of the above sodium base spent sulfite liquor containing 51% by weight total solids was treated with a hot aqueous solution of sodium metabisulfite comprising 100 g. of $Na_2S_2O_5$ dissolved in 100 ml. of water. The reaction mixture was allowed to cool and then was seeded with about 0.05 g. of powdered sodium mannose bisulfite and allowed to stand at room temperature. After three days, a sizeable crystalline phase was removed by vacuum filtration. The crystallized product was dissolved in 200 ml. of hot water. After cooling, 200 ml. of methanol was added to the aqueous solution, and the impure aqueous methanolic solution was allowed to stand for two days whereupon 19.7 g. (air-dry basis) of an off-white crystalline sodium mannose bisulfite product was recovered by filtration. The crystallized product had the following partial analysis:

| Dry solids | Percent by wt. |
|---|---|
| Sodium lignosulfonate | 5.9 |
| Carbohydrates (determined as free sugars): | |
| Xylose | 0.18 |
| Arabinose | 0.06 |
| Mannose | 54.50 |
| Glucose | 0.00 |
| Galactose | 0.22 |

The crystalline sodium mannose bisulfite product had a melting point of 151–156° C. as compared with the melting point of 164–166° C. for an authentic sample of sodium mannose bisulfite, the principal impurity of the crystalline product being sodium lignosulfonate.

EXAMPLE II

This example illustrates a process of the present invention for producing sodium mannose bisulfite from a sodium base spent sulfite liquor.

Eighty pounds of a concentrated spent sulfite liquor containing 48.3% solids (by weight) and 4.8 lbs. of mannose on a liquor basis (12.4% mannose on a solids basis) was treated with 10.8 lbs. of sodium metabisulfite dissolved in 21.2 lbs. of water. This mixture was heated to 65° C., diluted with 62.5 lbs. of methanol and seeded with 50 g. of crude powdered sodium mannose bisulfite. The mixture was stirred slowly and cooled by 12° C. per hour over a 4 hour period during which the mixture became quite viscous and cloudy with fine crystals of suspended sodium mannose bisulfite. The reaction mixture was then drained into a vacuum filtration apparatus having a fine cotton cloth filter. The recovered filter cake of crude sodium mannose bisulfite weighed 21.8 lbs. and contained 41% solids, equivalent to a dry yield of 8.94 lbs. On a dry basis, this material contained 11.5% sodium lignosulfonate and 50% mannose. The purity (on a mannose basis) was 79%. The yield of sodium mannose bisulfite (calculated from the mannose content of the spent sulfite liquor used) was 93% of theory. Purification of this crude product by reslurrying in hot 1:1 methanol water yielded a white product containing only 3% sodium lignosulfonate.

EXAMPLE III

The present example illustrates the preparation of sodium mannose bisulfite from aqueous prehydrolysis liquors obtained when wood chips are first digested or prehydrolyzed with hot water prior to cooking the prehydrolysis chips with a conventional kraft cooking liquor. The raw prehydrolysis liquor from southern pinewood was hydrolyzed and purified by known methods. The purified prehydrolysis liquor had the following partial analysis:

| Dry solids | Percent by weight | |
|---|---|---|
| Total solids | 38.2 | |
| | Free | Total |
| Carbohydrates: | | |
| Galactose | 9.4 | 18.1 |
| Glucose | 12.5 | 14.0 |
| Mannose | 28.1 | 31.8 |
| Arabinose | 3.6 | 3.7 |
| Xylose | 9.9 | 17.5 |

Two liters (2 l.) of the above purified wood sugar liquor containing 38.2% total solids was stirred while 456 grams of sodium metabisulfite was added to the solution. After standing overnight, the resultant solution was filtered to recover a heavy crop of off-white crystals of sodium mannose bisulfite. The precipitate was press dried with a rubber dam, the still moist precipitate weighing 1027 grams. The moist precipitate was slurried in one liter of methanol, the slurry filtered, and the precipitate washed thoroughly with methanol until the washings were colorless. The light tan crystalline product weighed 423 g., representing a yield of 79% based on mannose. The crystalline product had the following partial analysis:

| Dry solids—carbohydrates (determined as free sugars): | Percent by wt. |
|---|---|
| Galactose | 2.52 |
| Glucose | 1.52 |
| Mannose | 45.00 |
| Arabinose | 0.64 |
| Xylose | 2.16 |

The product had a melting point of 164° to 168° C. as compared with the melting point of an authentic sample of sodium mannose bisulfite of 164° to 166° C.

EXAMPLE IV

This example illustrates a process of the present invention for producing sodium mannose bisulfite from aqueous prehydrolysis liquor.

Five hundred ml. of the purified prehydrolysis liquor employed in Example III was treated with a total of 100 g. of sodium bisulfite added slowly to the solution with stirring. After the addition of 53 g., the solution color changed abruptly from orange to light yellow. The solution was allowed to stand overnight whereupon the solid precipitate was filtered and recovered. After standing, the recrystallized sodium mannose bisulfite product weighed 92 g.

EXAMPLE V

This example illustrates a process of the present invention for producing potassium mannose bisulfite from aqueous prehydrolysis liquor.

The procedure of Example III was repeated with the exception that 500 g. of potassium metabisulfite was substituted for the sodium salt. The potassium mannose bisulfite product recovered after filtration, washing and drying weighed 238 g.

EXAMPLE VI

This example illustrates a process of the present invention for producing sodium mannose bisulfite from prehydrolysis liquor.

Five hundred grams of concentrated prehydrolysis liquor containing 51.9% total solids was diluted with a solution of sulfurous acid (60.0 g. $SO_2$ in 2 l. of water) to obtain slightly over 2 liters of a solution having an approximate concentration of 10% total carbohydrate solids. The acidified solution had a pH of 1.8 and was heated at a temperature of 110° C. for a period of 4 hours. The hydrolysis reaction solution was then cooled and neutralized with an equimolar amount of sodium hydroxide, with respect to $SO_2$.

2142 ml. of the hydrolyzed solution was then concentrated to a volume of 500 ml., and sodium metabisulfite was added to bring the sodium bisulfite content of the concentrated solution to 45% by weight based on the prehydrolysis liquor total solids. After cooling and standing overnight, the concentrated solution was filtered to recover a thick precipitate. The precipitate was triturated in one l. of methanol and then filtered to recover a light-gray residue of sodium mannose bisulfite weighing 168.0 g. The crystalline sodium mannose bisulfite product had a melting point of 160 to 163° C.

EXAMPLE VII

The present example illustrates the recovery of sodium mannose bisulfite from sulfite prehydrolysis liquor obtained when wood chips are prehydrolyzed with an acid bisulfite liquor for up to 3.5 hours at temperatures as high as 140° C. The sulfite prehydrolysis liquor has an exceptionally high content of free mannose, 20 to 50% by weight of the total oven-dry wood components being solubilized as a result of the sulfite prehydrolysis process.

The sulfite prehydrolysis liquor was neutralized by the addition of an equimolar quantity of sodium hydroxide based on the $SO_2$ content of liquor. Additional sodium bisulfite was added to the neutralized solution to provide sufficient reagent to react with all of the monomeric sugars present in the solution. The reaction mixture was then concentrated to 40 to 60% by weight total solids, and then was cooled and allowed to stand to permit sodium mannose bisulfite to precipitate therefrom. The solution was then filterd to recover sodium mannose bisulfite in good yield.

EXAMPLE VIII

The procedure of Example VII was repeated with the exception that the cooled reaction solution was treated with methanol prior to filtration to increase the filtration rate and the yield of the sodium mannose bisulfite product.

EXAMPLE IX

This example illustrates the process for producing sodium mannose bisulfite from spent sulfite liquor.

Sodium base spent sulfite liquor (79.4 kg.) containing 50.4% solids and 14.8% mannose (on a solids basis) was treated with 13.1 kg. of sodium metabisulfite dissolved in 27.1 kg. of water. The mixture was stirred and diluted with 26.6 kg. of isopropanol and heated to 160° F. A small sample of crude sodium mannose bisulfite (100 g.) was then added as seed and the reaction mixture was stirred and cooled slowly to 70° F. over a period of four hours. A sample of liquid magma was removed from the reaction mixture and processed for recovery of sodium mannose bisulfite which was obtained in a proportional yield of 79.2%. After an additional 12 hours at 70° F., sodium mannose bisulfite was recovered in a proportional yield of 85.6%. These products were obtained by vacuum filtration and washing with cold 1:4 isopropanol water by weight. The recovered material had an off-white color and contained 57% mannose, equivalent to a purity of 90%.

EXAMPLE X

This example illustrates a process of the present invention for producing sodium mannose bisulfite from aqueous prehydrolysis liquor of southern pinewood.

Concentrated liquor (500.0 g., 62.6% total solids) from steam prehydrolysis of southern pinewood was diluted with a solution of sulfurous acid (60.0 g. $SO_2$ in 2 l. of water). The mixture (pH of 1.8) was placed in an oil-heated autoclave and reacted for four hours at 110° C. The cooled, hydrolyzed reaction product (2.38 l., pH 1.6) was treated with sodium hydroxide (37.6 g.) and concentrated to 550 ml. Sodium metabisulfite (17.6 g.) was added and, after standing overnight, the mixture was fitered to remove sodium mannose bisulfite. This bisulfite addition product, which was washed with methanol and dried, was obtained as a light gray crystalline powder in 78.8% yield based on mannose.

EXAMPLE XI

This example illustrates a process of the present invention for producing potassium mannose bisulfite.

A solution of mannose (180 g.) and potassium metabisulfite (111.1 g.) in water (300 ml.) was allowed to stand for 3 days. The mixture was then filtered and the precipitate was washed with methanol-water (1:1) and dried to yield white crystal of potassium mannose bisulfite (161.9 g.). Upon cooling the filtered solution, an additional quantity of product (6.6 g.) could be recovered. Overall yield of potassium mannose bisulfite product was 56.2%.

EXAMPLE XII

This example illustrates a process of the present invention for producing ammonium mannose bisulfite from mannose.

A solution of ammonium bisulfite (213 g., 46.5% conc.) was added to mannose solution (180 g.) in water (400 ml.). The mixture was allowed to stand at room temperature for two days and in a refrigerator for an additional day. Ammonium mannose bisulfite crystals precipitated out of the solution and were recovered by filtration. The crystals were washed with a methanol-water solution (1:1) and dried to yield 93.5 g. of product. Additional fractions of product (63.7 g.) were obtained by repeating this procedure. Thus, ammonium mannose bisulfite product was obtained in an overall yield of 56.3%.

EXAMPLE XIII

This example illustrates a process of the present invention for producing ammonium mannose bisulfite from a mixture of wood sugars containing mannose.

To a solution of mixed wood sugars containing D-mannose (40 g.), D-galactose (20 g.), D-glucose (20 g.), D-xylose (10 g.) and L-arabinose (10 g.) in water (200 ml.) was added a solution of concentrated ammonium bisulfite (123 g., 46.5% $NH_4HSO_3$) in equimolar quantity. The combined mixture was seeded with a small quantity of ammonium mannose bisulfite and allowed to stand at 3° C. for three weeks. The resulting precipitate was filtered off, washed with cold water-methanol (300 ml., 3:1) and methanol (300 ml.), and dried to give white crystals (11.9 g.) of slightly impure ammonium mannose bisulfite.

EXAMPLE XIV

A small digester was charged with southern pine chips (5.97 kg., 53.6% O.D.) and sodium acid bisulfite liquor (12.6 l. 6.00% total $SO_2$, 5.40% free $SO_2$). The reaction temperature was increased to 138° C. over a period of 2 hours, 15 minutes and held at that temperature for an additional 55 minutes with full liquor circulation. The resulting liquor was drained (11.2 kg., 8.5% total solids, sp. gr. 1.052; pH 0.95) and the chips were washed with hot circulated water (12.6 l., 90° C.) for 10 minutes. The wash drainings (10.59 kg., 2.4% total solids, sp. gr. 1.008, pH 2.0) were combined with the original liquor and 50% sodium hydroxide (236 ml.) was added. The solution was evaporated (1.93 l.), allowed to stand for two weeks, triturated with an equal volume of methanol and filtered. The solids were then washed with methanol and dried to yield light gray, crystalline sodium mannose bisulfite, 487.5 g., 80.7% yield based on available mannose.

EXAMPLE XV

This example illustrates a process of the present invention for regenerating mannose from sodium mannose bisulfite employing a bicarbonate reagent.

A dry, equimolar blend of 2272 grams (8 moles) of sodium mannose bisulfite and 672 grams (8 moles) of sodium bicarbonate was placed in an upright reactor equipped with a stirrer and stainless steel heating coils.

The reactor had been preheated to 82° C., and 2 liters of water preheated to 92° C. were added to dissolve the blend. The stirrer was started and the reaction began immediately as indicated by frothing of the reaction mixture due to the evolution of carbon dioxide. The temperature was maintained at about 90° C., with continuous stirring, for 16 minutes at which time 16 liters of ethanol preheated to 70° C. were added and the stirring continued for an additional 10 minutes. By this time, the reaction was completed and evolution of carbon dioxide had ceased.

The hot, impure ethanolic-mannose solution was drained from the reactor and quickly filtered through a celite pad to remove 936.8 grams of sodium sulfite and other by-products and impurities formed during the reaction. The slightly alkaline filtrate was then immediately neutralized with 40 grams of calcium chloride dissolved in aqueous ethanol and refiltered through a celite pad to remove the remaining impurities and color bodies. The ethanol was then stripped from the filtrate and the aqueous mannose solution was evaporated to 1200 mls. of clear, colorless syrup. On analysis, this syrup was found to have a pH of 6.8, a total solids content of 73.5 percent and a specific gravity of 1.387. The syrup contained 1223.3 grams of mannose which was equivalent to an 85 percent yield of the pure sugar based on the weight of the sodium mannose bisulfite product present initially.

EXAMPLE XVI

This example illustrates a process of the present invention for regenerating mannose from sodium mannose bisulfite employing a bicarbonate reagent.

Crude sodium mannose bisulfite (2.27 kg.) from sodium base spent sulfite liquor was combined with sodium bicarbonate (67.2 g.) in a water-jacketed stainless steel tank which had been preheated to 82° C. Hot water (2 l., 98° C.) was added, stirring was initiated and additional heat was supplied through a steam coil inserted into the reaction mixture. Considerable frothing occurred which was controlled by the addition of a few milliliters of hot ethanol. After 16 minutes at a temperature of 80–85° C. hot ethanol (16 l., 70° C.) was added and the hot mixture was stirred for 10 minutes and then filtered. The filtrate was neutralized with a water-ethanol solution (267 ml., 1:3) of calcium chloride (40 g.). This mixture was filtered and the filtrate (pH 7.2) was evaporated to remove ethanol. The resulting light yellow concentrate (1200 ml., 73.5% total solids, sp. gr. 1.387, pH 6.8, 85% theoretical yield) was shown to be essentially pure mannose with traces of glucose, fructose and xylose.

EXAMPLE XVII

This example illustrates a process of the present invention for regenerating mannose from sodium mannose bisulfite employing a carbonate reagent.

A thick pasty mixture was prepared containing sodium mannose bisulfite (28.4 g.), sodium carbonate (5.8 g.), and water (25 ml.). The thick paste was warmed to 70° C. for 10 minutes during which time vigorous evolution of carbon dioxide occurred. Hot ethanol (200 ml.) was then added and, after 10 minutes at a temperature of 70° C., the reaction mixture was filtered hot. The insoluble residue was further extracted with hot ethanol and the resulting filtrate was combined with the mother liquor. The alcohol was removed from the combined solution by evaporation and a light yellow solution resulted. This solution was then diluted to 100 ml. (12.0% total solids content, sp. gr. 1.055, 70% yield). The solution was found, by chromatographic techniques, to contain primarily mannose with traces of glucose and galactose.

EXAMPLE XVIII

This example illustrates a process of the present invention for regenerating mannose from ammonium mannose bisulfite employing a bicarbonate reagent.

Ammonium mannose bisulfite (69.8 g.) was combined with sodium bicarbonate (42.0 g.) and processed by the procedure of Example XV. A light yellow syrup (80 ml., 20.5% total solids content, specific gravity 1.094, 36.7% yield) was obtained consisting essentially of pure mannose.

EXAMPLE XIX

This example illustrates a process of the present invention for regenerating mannose from potassium mannose bisulfite employing a bicarbonate reagent.

Potassium mannose bisulfite (75 g.) and sodium bicarbonate (21 g.) were mixed and boiling water (60 ml.) was added. The stirred mixture was heated on a hot plate for 20 minutes. The hot solution (80° C.) was then placed on a steam bath and hot ethanol (500 ml., 78° C.) was added with stirring. The mixture was filtered and the solids again extracted with hot ethanol (500 ml., 78° C.). After filtration, the combined filtrate was neutralized with calcium chloride (8 g.) dissolved in a water (14 ml.)-ethanol (42 ml.) solution. The filtered solution (pH 6.2) was evaporated to a light yellow syrup (80 ml., 38.4% total solids content, sp. gr. 1.268, 86.4% yield) containing primarily mannose with a trace of glucose.

EXAMPLE XX

This example illustrates a process of the present invention for regenerating mannose from sodium mannose bisulfite employing sodium hydroxide reagent.

A solution of sodium hydroxide (80 g.) in water (500 ml.) was added to sodium mannose bisulfite (568 g.). The reaction mixture was heated to 75–80° C. and maintained in that temperature range for 10 minutes. Hot ethanol (4 l.) was added to the stirred mixture and, after an additional 10 minutes at 75° C., the mixture was filtered. The amber colored filtrate (pH 9.6) was treated with a solution of calcium chloride (10 g.) in water (17 ml.)-ethanol (50 ml.) solution. After filtration, the ethanol was removed by evaporating and the orange colored residual syrup (300 ml., 64.3% total solids, sp. gr. 1.403, 81% yield) was found to contain a predominance of mannose.

EXAMPLE XXI

This example illustrates a process of the present invention for producing mannitol from sodium mannose bisulfite employing calcium chloride reagent.

A solution containing sodium mannose bisulfite (28.4 g.), anhydrous calcium chloride (5.16 g.), and water (200 ml.) was refluxed for 7 hours. During the period of reflux, sulfur dioxide was evolved and a white precipitate formed (6.1 g.) which was removed by filtration. One half of the mannose containing filtrate was diluted to 125 ml. and the pH was adjusted to about, 8.0. The resulting solution was treated with Raney nickel (10 g.) and agitated for eight hours under hydrogen (49 p.s.i.g.). The catalyst was removed by filtration and the filtrate evaporated to dryness. The resulting white crystalline solid was recrystallized from methanol-water to yield mannitol, 3.9 g., 43% yield.

EXAMPLE XXII

This example illustrates a process of the present invention for regenerating mannose from sodium mannose bisulfite employing electrodialysis techniques.

A solution of sodium mannose bisulfite (15.0 g.) in water (800 ml.) was electrodialyzed using cationic and anionic membranes, 61–AZL–066 and 111–BZL–066, respectively (both of these membrances being products of Ionics, Inc., Cambridge, Mass.) The solution temperature was maintained below 45° C. and the current was not allowed to exceed 2 amps throughout the course of the 2 hour electrodialysis. The colorless solution was evaporated to dryness and placed in a vacuum oven (50° C.) overnight. A clear viscous syrup (9.14 g., 96.2% yield) was thus produced. The syrup (0.01% ash) was analyzed chromatographically and shown to contain only mannose.

EXAMPLE XXIII

This example illustrates a process of the present invention for regenerating mannose from sodium mannose bisulfite employing ion-exchange techniques.

Sodium mannose bisulfite (700 g.) in water (4 l.) was passed down a column containing 1 l. of a strong cation exchanger (Amberlite IR–120 H+, a product of Rohm-Haas, Philadelphia, Pa.) to produce a decationized solution. Thereafter, the resin was washed with water (1 l.) and the resulting solution was combined with the original solution. The combined solution, having a strong odor of $SO_2$, was then evaporated to 3 l. This washing process was repeated an additional three times. The total decationized solution was then passed through a column containing 1.6 l. of a weak anion resin (Duolite A–4, a product of Diamond Alkali, Redwood City, Calif.). The resulting solution was evaporated to dryness and the solids were extracted with hot ethanol (2 l.). The mixture was filtered and the remaining solids were again extracted with hot ethanol (1.5 l.). After filtration, the combined ethanolic extracts were evaporated to a light amber syrup which was found by chromatographic techniques to contain mannose exclusively (444 g., 62.4% total solids, 62.3% yield).

The invention in its broader scope is not limited to the specific compositions, steps and methods described, but departures may be made therefrom within the scope of the accompanying claims without departing from the principles of the invention and without sacrificing its chief advantages.

We claim:

1. A process for the preparation and recovery of mannose bisulfite adducts from a mannose-containing aqueous, gross carbohydrate mixture which comprises reacting said gross mixture with an amount of a bisulfite reagent selected from the group consisting of sodium bisulfite, potassium bisulfite, ammonium bisulfite, and mixtures thereof, sufficient to react with and form the corresponding bisulfite adducts of all of the sugars present in the solution, selectively separating the mannose bisulfite adducts from said mixture by preferentially precipitating crystals of the resultant mannose bisulfite adducts, and separating and recovering said crystals of said mannose bisulfite adducts.

2. The process of claim 1 wherein said aqueous gross carbohydrate mixture is a liquor from wood pulping operations selected from the group consisting of spent sulfite pulping liquors, aqueous prehydrolysis liquors and sulfite prehydrolysis liquors.

3. The process of claim 1 wherein said mannose bisulfite adducts are recrystallized to obtain a substantially pure crystalline product.

4. The process of claim 1 wherein said aqueous gross mixture is at a temperature of between about 0° to 150° C. when treated with said bisulfite reagent, the amount of said bisulfite reagent present in said aqueous mixture being treated initially comprising from about 30 to 40% by weight of the total carbohydrate solids present in said mixture, and wherein said aqueous mixture is concentrated to about 20 to 50% by weight total carbohydrate solids, cooled to ambient temperature upon completion of the reaction and seeded with crystals of the appropriate mannose bisulfite adduct to initiate preferential crystallization of the corresponding mannose addition bisulfite product.

5. The process of claim 4 including the addition of an aliphatic alcohol having from 1 to 4 carbon atoms to said cooled solution prior to seeding.

6. The process of claim 1 wherein said gross mixture is treated with a mineral acid to hydrolyze the polysaccharides therein and convert them to the corresponding monomeric sugars.

7. The process of claim 6 wherein said mineral acid is sulfurous acid.

8. The process of claim 7 wherein said gross mixture is hydrolyzed at a temperature of from about 110° to 150° C. for about 0.5 to 6 hours, the concentration of $SO_2$ in the solution being about 1.75 to 3.6% by weight.

9. The process of claim 8 wherein said hydrolyzed mixture is neutralized with an aqueous solution of an alkali metal hydroxide, the amount of bisulfite reagent present in said aqueous mixture initially comprising from about 30 to 40% by weight of the total carbohydrate solids present in said mixture, and wherein said aqueous mixture is concentrated to about 20 to 50% by weight total carbohydrate solids, cooled, and seeded with crystals of the appropriate mannose bisulfite adduct to initiate preferential crystallization of the corresponding mannose bisulfite addition product.

10. The process of claim 9 including the addition of an aliphatic alcohol having 1 to 4 carbon atoms to said cooled mixture prior to seeding.

11. A process for producing a substantially pure monosaccharide from a corresponding sugar bisulfite adduct which comprises reacting said adduct with a corresponding reagent selected from the group consisting of carbonates and bicarbonates to convert said adduct substantially quantitatively to free monosaccharide.

12. The process of claim 11 wherein said sugar bisulfite adduct is selected from the group consisting of alkali metal mannose bisulfites and ammonium mannose bisulfite.

13. The process of claim 12 wherein said reagent is selected from the group consisting of alkali metal carbonates, alkali metal bicarbonates, alkali metal hydroxides, alkaline earth metal hydroxides and mixtures thereof.

14. A process for producing a substantially pure monosaccharide from a corresponding sugar bisulfite adduct which comprises dissolving substantially equimolar amounts of said sugar bisulfite adduct and a corresponding reagent selected from the group consisting of carbonates and bicarbonates in sufficient hot water to form a thick syrup, maintaining said syrupy reaction solution at a temperature of between about 70° and 100° C., with stirring, until the evolution of carbon dioxide gas ceases, mixing said hot syrupy reaction solution with between about 6 to 10 volumes of a hot aliphatic alcohol and then filtering the resulting alcoholic solution to remove alcohol insoluble materials therefrom, neutralizing the hot sugar-containing alcoholic filtrate with an alcoholic solution of calcium chloride and then filtering the resulting neutralized alcoholic solution to remove precipitated impurities and color bodies, and removing the alcohol content of said filtrate to recover an aqueous solution of substantially pure monosaccharide.

15. The process of claim 14 wherein said syrupy reaction solution is stirred for about 10 to 20 minutes prior to the addition of hot alcohol thereto.

16. The process of claim 15 wherein said alcohol is ethanol.

17. The process of claim 16 wherein about 8 volumes of hot ethanol is mixed with said hot syrupy reaction solution.

18. The process of claim 14 wherein said sugar bisulfite adduct is selected from the group consisting of alkali metal mannose bisulfite and ammonium mannose bisulfite.

19. The process of claim 18 wherein said reagent is selected from the group consisting of alkali metal carbonates, alkali metal bicarbonates, alkali metal hydroxides, alkaline earth metal hydroxides and mixtures thereof.

20. The process of claim 18 wherein said sugar bisulfite adduct is obtained by reacting spent liquor from wood pulping operations with a corresponding bisulfite reagent.

21. A process for producing a substantially pure monosaccharide from a corresponding sugar bisulfite adduct which comprises forming an aqueous reaction solution of said adduct with calcium chloride, heating said reaction solution to remove the sulfur content therefrom and to produce a final aqueous solution of free monosaccharide.

22. The process of claim 21 including the step of recovering a substantially pure crystalline monosaccharide.

23. The process of claim 21 wherein said sugar bisulfite adduct is selected from the group consisting of alkali metal mannose bisulfites and ammonium mannose bisulfite.

24. The process of claim 21 wherein said aqueous reaction solution is refluxed until the evolution of sulfur dioxide and the concurrent precipitation of calcium sulfite ceases.

25. The process of claim 24 wherein sulfur dioxide is removed from said reaction solution by a technique selected from the group consisting of steam stripping, vacuum stripping and forced air stripping; and calcium sulfite is removed from said reaction solution by filtration.

26. A process for producing a substantially pure monosaccharide from a corresponding sugar bisulfite adduct which comprises forming an aqueous solution of said sugar bisulfite adduct, and subjecting said aqueous solution to electrodialysis to produce a final solution containing free monosaccharide.

27. The process of claim 26 including the step of recovering substantially pure monosaccharide crystals.

28. The process of claim 26 wherein said sugar bisulfite adduct is selected from the group consisting of alkali metal mannose bisulfites and ammonium mannose bisulfites.

29. The process of claim 26 wherein said aqueous solution is maintained at less than about 45° C. during electrodialysis and the electrodialysis current employed is less than about 2 amps throughout the course of the electrodialysis.

30. The process of claim 29 including the steps of evaporating said final solution to dryness, and heating the evaporated product at a temperature of about 50° C. to produce a viscous syrup containing free monosaccharide.

31. A process for producing a substantially pure monosaccharide from a corresponding sugar bisulfite adduct which comprises forming an aqueous solution of said sugar bisulfite adduct, passing said aqueous solution through an ion-exchange column containing a cationic exchange resin to obtain a decationized solution, and passing the decationized solution through an ion-exchange column containing an anionic exchange resin to produce a solution containing free monosaccharide.

32. The process of claim 31 wherein said sugar bisulfite adducts are selected from the group consisting of alkali metal mannose bisulfites and ammonium mannose bisulfites.

33. The process of claim 31 including the steps of evaporating said solution containing free monosaccharide to dryness, extracting the solids with an alcoholic reagent, filtering the resulting alcoholic solution, and evaporating said alcoholic solution to produce a pure monosaccharide syrup.

34. The process of claim 33 wherein said alcoholic reagent for extracting said solids is ethanol.

35. A process for isolating and recovering the mannose content of a mannose-containing aqueous solution which comprises forming bisulfite adducts of the mannose content of said solution, preferentially crystallizing said adducts out of said solution, recovering said mannose bisulfite adducts, reacting said recovered adducts with a corresponding reagent selected from the group consisting of carbonates and bicarbonates to convert said adducts substantially quantitatively to free mannose.

36. The process of claim 35 including the step of recovering substantially pure mannose crystals.

37. The process of claim 35 wherein said mannose-containing solution is selected from the group consisting of spent sulfite hydrolysis liquors, sulfite prehydrolysis liquors, aqueous prehydrolysis liquors and mixtures thereof.

38. The process of claim 37 wherein said bisulfite adducts are formed by treating said mannose-containing solution with a reagent selected from the group consisting of alkali metal bisulfites and ammonium bisulfite.

39. The process of claim 35 wherein said bisulfite adducts are selected from the group consisting of alkali metal mannose bisulfites and ammonium mannose bisulfites.

40. The process of claim 39 wherein said reagent is selected from the group consisting of alkali metal carbonates, alkali metal bicarbonates, alkali metal hydroxides, alkaline earth metal hydroxides and mixtures thereof.

41. The process of claim 40 including dissolving substantially equimolar amounts of said mannose bisulfite adducts and said reagent in sufficient hot water to form a thick syrup, maintaining said syrupy reaction solution at a temperature of between about 70° and 100° C., with stirring, until the evolution of carbon dioxide gas ceases, mixing said hot syrupy reaction solution with between about 6 to 10 volumes of a hot aliphatic alcohol and then filtering the resulting alcoholic solution to remove alcohol insoluble materials therefrom, neutralizing the hot mannose-containing alcoholic filtrate with an alcoholic solution of calcium chloride and then filtering the resulting neutralized alcoholic solution to remove precipitated impurities and color bodies, and removing the alcohol content of said filtrate to recover an aqueous solution of substantially pure mannose.

42. A process for isolating and recovering the mannose content of a mannose-containing aqueous solution which comprises forming bisulfite adducts of the carbohydrate content of said solution, preferentially crystallizing mannose bisulfite adducts out of said solutions, recovering said mannose bisulfite adducts, forming an aqueous reaction solution of said adducts with calcium chloride, heating said reaction solution to remove the sulfur content therefrom and to produce a final aqueous solution of free mannose.

43. The process of claim 42 including the step of recovering substantially pure crystalline mannose.

44. The process of claim 42 wherein said bisulfite adducts are selected from the group consisting of alkali metal mannose bisulfites and ammonium mannose bisulfite.

45. The process of claim 42 wherein said mannose-containing solution is selected from the group consisting of spent sulfite hydrolysis liquors, sulfite prehydrolysis liquors, aqueous prehydrolysis liquors and mixtures thereof.

46. The process of claim 45 wherein said bisulfite adducts are formed by treating said mannose-containing solution with a reagent selected from the group consisting of alkali metal bisulfites and ammonium bisulfite.

47. The process of claim 46 wherein said aqueous reaction solution is refluxed until the evolution of sulfur dioxide and the concurrent precipitation of calcium sulfite ceases.

48. The process of claim 47 wherein sulfur dioxide is removed from the reaction solution by a technique selected from the group consisting of steam stripping, vacuum stripping and forced air stripping; and calcium sulfite is removed from said reaction solution by filtration.

49. A process for isolating and recovering the mannose content of a mannose-containing aqueous solution which comprises forming bisulfite adducts of the carbohydrate content of said solution, preferentially crystallizing mannose bisulfite adducts out of said solutions, recovering said mannose adducts, forming an aqueous solution of said mannose adducts, and subjecting said aqueous solution to electrodialysis to produce a final solution containing free mannose.

50. The process of claim 49 including the step of recovering substantially pure mannose crystals.

51. The process of claim 49 wherein said bisulfite adducts are selected from the group consisting of alkali metal mannose bisulfites and ammonium mannose bisulfite.

52. The process of claim 49 wherein said mannose-containing solution is selected from the group consisting of spent sulfite hydrolysis liquors, sulfite prehydrolysis liquors, aqueous prehydrolysis liquors and mixtures thereof.

53. The process of claim 52 wherein said bisulfite adducts are formed by treating said mannose-containing solution with a reagent selected from the group consisting of alkali metal bisulfites and ammonium bisulfite.

54. A process for isolating and recovering the mannose content of a mannose-containing aqueous solution which comprises forming bisulfite adducts of the carbohydrate content of said solution, preferentially crystallizing mannose bisulfite adducts out of said solutions, recovering said mannose adducts, forming an aqueous solution of said mannose adducts, passing said aqueous solution through an ion-exchange column containing a cationic exchange resin to obtain a decationized solution, passing the decationized solution through an ion-exchange column containing an anionic exchange resin to produce a solution containing free mannose.

55. The process of claim 54 including the step of recovering substantially pure crystalline mannose.

56. The process of claim 54 wherein said bisulfite adducts are selected from the group consisting of alkali metal mannose bisulfites and ammonium mannose bisulfite.

57. The process of claim 54 including the steps of evaporating said solution containing free mannose to dryness, extracting the solids with an alcoholic reagent, filtering the resulting alcoholic solution, and evaporating said alcoholic solution to produce a pure mannose syrup.

58. The process of claim 57 wherein said alcoholic reagent for extracting said solids is ethanol.

59. The process of claim 54 wherein said mannose-containing solution is selected from the group consisting of spent sulfite hydrolysis liquors, sulfite prehydrolysis liquors, aqueous prehydrolysis liquors and mixtures thereof from wood pulping operations.

60. The process of claim 59 wherein said bisulfite adducts are formed by treating said mannose-containing solution with a reagent selected from the group consisting of alkali metal bisulfites and ammonium bisulfite.

References Cited

UNITED STATES PATENTS

| | | | |
|---|---|---|---|
| 3,505,243 | 4/1970 | Steinberg | 260—124 R |
| 3,542,590 | 11/1970 | Paabo | 162—16 X |
| 2,818,851 | 1/1958 | Khym | 127—46 X |
| 3,098,869 | 7/1963 | Borchert | 260—209 R |
| 3,231,559 | 1/1966 | Wheeler | 260—209 R |
| 3,231,560 | 1/1966 | Keen | 260—209 R |

OTHER REFERENCES

J. B. S. Braverman et al., J. Food Sci., 26, 248–52 (1961).

Chemical Abstracts 41:7750i.

"Advances in Carbohydrate Chemistry," M. L. Wolfrom ed., vol. 21, 209–220, Academic Press, New York, N.Y., 1966.

Chemical Abstracts 63:7200h, 1965.

MORRIS O. WOLK, Primary Examiner

S. MARANTZ, Assistant Examiner

U.S. Cl. X.R.

127—37, 54; 162—16; 260—124 R